United States Patent
Lanfer et al.

(10) Patent No.: US 12,038,328 B2
(45) Date of Patent: Jul. 16, 2024

(54) GENERATION OF A BI-DIRECTIONAL TEXTURE FUNCTION

(71) Applicant: BASF Coatings GmbH, Münster (DE)

(72) Inventors: Benjamin Lanfer, Münster (DE); Guido Bischoff, Münster (DE); Thomas Kantimm, Münster (DE)

(73) Assignee: BASF COATINGS GMBH, Muenster (DE)

( * ) Notice: Subject to any disclaimer, the term of this patent is extended or adjusted under 35 U.S.C. 154(b) by 325 days.

(21) Appl. No.: 17/442,491

(22) PCT Filed: Mar. 25, 2020

(86) PCT No.: PCT/EP2020/058444
§ 371 (c)(1),
(2) Date: Sep. 23, 2021

(87) PCT Pub. No.: WO2020/200982
PCT Pub. Date: Oct. 8, 2020

(65) Prior Publication Data
US 2022/0163393 A1    May 26, 2022

(30) Foreign Application Priority Data
Mar. 29, 2019 (EP) .................... 19166352

(51) Int. Cl.
*G01J 3/50* (2006.01)
*G01J 3/46* (2006.01)

(52) U.S. Cl.
CPC ............... *G01J 3/504* (2013.01); *G01J 3/462* (2013.01)

(58) Field of Classification Search
CPC .................................. G01J 3/504; G01J 3/462
See application file for complete search history.

(56) References Cited

U.S. PATENT DOCUMENTS

| 8,872,811 | B1 | 10/2014 | Rump et al. |
| 9,958,265 | B2* | 5/2018 | Nagai ................ G01N 21/8422 |
| 2006/0227137 | A1* | 10/2006 | Weyrich ................. G06T 15/50 345/426 |
| 2008/0158239 | A1 | 7/2008 | Lamy et al. |
| 2016/0224861 | A1* | 8/2016 | Vogh, Jr. ................ G06V 10/56 |

OTHER PUBLICATIONS

International Search Report and Written Opinion for corresponding PCT/EP2020/058444 dated Jun. 8, 2020, 16 Pages.
(Continued)

*Primary Examiner* — Tarifur R Chowdhury
*Assistant Examiner* — Carlos Perez-Guzman
(74) *Attorney, Agent, or Firm* — Armstrong Teasdale LLP

(57) ABSTRACT

Described herein is a method for generating a bi-directional texture function (BTF) of an object, the method including at least the following steps:
measuring an initial BTF for the object using a camera-based measurement device,
capturing spectral reflectance data for the object for a pre-given number of different measurement geometries using a spectrophotometer, and
adapting the initial BTF to the captured spectral reflectance data), thus, gaining an optimized BTF.
Also described herein are respective systems for generating a bi-directional texture function of an object.

16 Claims, 1 Drawing Sheet

(56) References Cited

OTHER PUBLICATIONS

Durikovic et al.,"Modeling the BRDF from spectral reflectance measurements of metallic surfaces", Applied Surface Science, vol. 312, pp. 87-90 (2014), XP029038984.
Guenther et al.,"Efficient Acquisition and Realistic Rendering of Car Paint", VMV, 10 pages (2005), XP055553580.
McAllister et al.,"Efficient Rendering of Spatial Bi-directional Reflectance Distribution Functions", The Eurographics Association, pp. 79-88,157 (2002), XP058155528.
Kirchner et al.,"Observation of Visual Texture of Metallic and Pearlescent Materials", Color Research and Application, vol. 32, No. 4, pp. 256-266 (2007).
Dana et al.,"Reflectance and Texture of Real-World Surfaces" ACM Transactions on Graphics, vol. 18, No. 1, pp. 1-34 (1999).
Lee et al.,"Scattered Data Interpolation with Multilevel B-Splines", IEEE Transactions on Visualization and Computer Graphics, vol. 3, No. 3, pp. 228-244 (1997).

\* cited by examiner

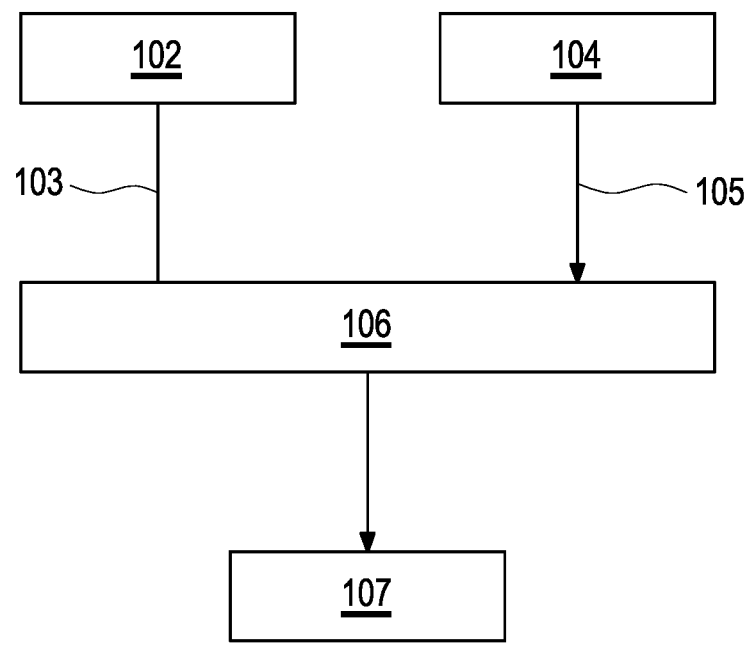

GENERATION OF A BI-DIRECTIONAL TEXTURE FUNCTION

CROSS-REFERENCE TO RELATED APPLICATIONS

This application is a U.S. National Phase Application of International Patent Application No. PCT/EP2020/058444, filed Mar. 25, 2020, which claims priority to European Patent Application No. 19166352.5, filed Mar. 29, 2019, the entire contents of which are hereby incorporated by reference herein.

The present disclosure relates to a method for generating a bi-directional texture function (BTF) of an object, particularly of a physical car paint sample. The present disclosure also refers to a respective system and to a respective computer system.

BACKGROUND

Current car paint color design processes are based on physical samples of a car paint applied to most often small flat panels. Working only with physical samples has several drawbacks. Painting the samples is costly and takes time. In addition, due to cost only small flat panels are painted and it can be difficult to infer from the small samples how a coating would look like on a different shape, for example, a car body, or in a different light setting. Car paints are often chosen as effect colors with gonioapparent effects, particularly caused by interference and/or metallic pigments, such as metallic flake pigments or special effect flake pigments, such as, pearlescent flake pigments.

Using a digital model of an appearance of the car paint it is possible to computer-generate images of the car paint applied to an arbitrary shape in arbitrary light conditions. A bidirectional texture function (BTF) represents such a digital model that can capture also a spatially varying appearance of a car paint, such as sparkling. Based on computer-generated images of the car paint applied to an object it is possible to virtually assess characteristics of a color of the car paint.

The BTF is a representation of the appearance of texture as a function of viewing and illumination direction, i.e. viewing and illumination angle. It is an image-based representation, since the geometry of the surface of the object to be considered is unknown and not measured. BTF is typically captured by imaging the surface at a sampling of the hemisphere of possible viewing and illumination directions. BTF measurements are collections of images. The BTF is a 6-dimensional function. (Dana, Kristin J., Bram van Ginneken, Shree K. Nayar, and Jan J. Koenderink. 'Reflectance and Texture of Real-World Surfaces'. *ACM Transactions on Graphics* 18, no. 1 (1 Jan. 1999): 1-34. https://doi.org/10.1145/300776.300778.)

SUMMARY

Up to now, a BTF was measured for colors (paints) using a camera-based measurement device. The used camera-based measurement device is configured to quickly acquire reflectance data for many measurement geometries. The used device is also able to capture spatially varying aspects of a car paint, for example, the sparkling of the effect pigments or the texture of a structured clearcoat. However, it has been found that the color information is not sufficiently accurate and reliable for a color design review use case.

Therefore, it was an objective of the present disclosure to provide color information more accurately, particularly to provide a possibility to further optimize the measured BTF.

A method, a system and a computer system for generating a bi-directional texture function of an object with the features of the independent claims are provided, respectively. Further features and embodiments of the claimed method and systems are described in the dependent claims and in the description.

According to claim 1, a method for generating a bi-directional texture function (BTF) of an object is provided, the method comprising at least the following steps:
   measuring an initial BTF for the object using a camera-based measurement device,
   capturing spectral reflectance data for the object for a pre-given number, i.e. a limited number of different measurement geometries using a spectrophotometer,
   adapting the initial BTF to the captured spectral reflectance data, thus, gaining an optimized BTF.

To solve the problem considering the above mentioned insufficient color accuracy it is proposed, according to the claimed method, that in a first step an initial BTF of the object, particularly of a physical car paint sample is acquired using the camera-based measurement device. Then, in a second step, a second spectral measurement is done on the same sample using a spectrophotometer, particularly a hand-held spectrophotometer. Thus, additional, more accurate spectral reflectance data for a small number (e. g. <25) of measurement geometries are obtained. The initial BTF is then enhanced with the more accurate but sparse spectral reflectance data. The result is a BTF which captures the color and the spatially varying appearance, such as sparkling of the car paint sample and is still sufficiently accurate.

According to one embodiment of the claimed method, the camera-based measurement device creates a plurality of images (photos) of the object/sample at different viewing angles, at different illumination angles, at different illumination colors and/or for different exposure times, thus providing a plurality of measurement data considering a plurality of combinations of illumination angle, viewing angle, illumination color and/or exposure time. The camera-based measurement device can be a commercially available measurement device, such as, for example, the X-Rite TAC7®. A small flat panel coated with the car paint sample and a clear-coat is inserted into the measurement device and the measurement process is started. From the measurement and a subsequent post-processing the initial BTF is obtained.

In the course of the post-processing, the images/photos with different illumination color and different exposure time, but with equal illumination angle and viewing angle are combined to images with high dynamic range, respectively. Further, the perspective of the photos onto the sample is corrected. On the basis of the data gained by the photos and the post-processing, the parameters of the initial BTF are determined.

According to a further embodiment of the claimed method, adapting the initial BTF to the captured spectral reflectance data, thus, gaining an optimized BTF, comprises to segment the initial BTF into different terms, each term comprising a set of parameters, and to optimize the parameters of each term separately using the captured spectral reflectance data.

Thereby, the initial BTF is segmented (divided) into two main terms, a first term being a homogeneous bi-directional reflectance distribution function (BRDF) which describes reflectance properties of the object, e.g. the car paint sample, depending only on the measurement geometry, and a second term being a texture function which accounts for a spatially varying appearance of the object, i.e. which adds a view and illumination dependent texture image. The texture images stored in the model have the property that on average across all pixels the sum of the intensities in each of the RGB channels is zero. When viewed from afar the overall color impression of the car paint is determined not by the color at a single point but by the average color of a larger area. Due to the above-mentioned property it is assumed that the average color across a larger region of the texture image is zero or close to zero. This allows to overlay the texture image without changing the overall color. This also means that the texture images can be ignored when optimizing the BTF.

For the representation of the BTF the color model first introduced by Rump et al. (Rump, Martin, Ralf Sarlette, and Reinhard Klein. "Efficient Resampling, Compression and Rendering of Metallic and Pearlescent Paint." In Vision, Modeling, and Visualization, 11-18, 2009) is used:

$$f(x, \bar{i}, \bar{o}) = \chi(\bar{i}, \bar{o})\left(\frac{a}{\pi} + \sum_{k=1}^{3} f_{S_k, \alpha_k, F_{0,k}}^{CT}(\bar{i}, \bar{o})\right) + \Xi(x, \bar{i}, \bar{o}) \quad (1)$$

x: Surface coordinates of the sample/object
$\bar{i}, \bar{o}$: Illumination and observation/viewing directions at the basecoat of the sample
$\chi(\bar{i},\bar{o})$: Color table depending on illumination and observation direction
α: Albedo or diffuse reflectivity
$f_{S_k, \alpha_k, F_{0,k}}^{CT}$: The k-th Cook-Torrance lobe; the Cook-Torrance lobe is a commonly used BRDF that describes the glossiness of a microfacet surface
$S_k$: Weight for the k-th Cook-Torrance lobe
$\alpha_k$: Parameter for the Beckmann distribution of the k-th Cook-Torrance lobe
$F_{o,k}$: Fresnel reflectivity for the k-th Cook-Torrance lobe
$\Xi(x, \bar{i},\bar{o})$: Table of spatial texture images depending on illumination and observation direction Generally, the bidirectional reflectance distribution function (BRDF) is a function of four real variables that defines how light is reflected at an opaque surface. The function takes an incoming light direction $\bar{i}$ and an outgoing direction $\bar{o}$ and returns the ratio of reflected radiance exiting along $\bar{o}$ to the irradiance incident on the surface from direction $\bar{i}$. BRDF means a collection of photometric data of any material (herein meaning the object, i.e. the paint sample) that will describe photometric reflective light scattering characteristics of the material (the object) as a function of illumination angle and reflective scattering angle. The BRDF describes the spectral and spatial reflective scattering properties of the object, particularly of a gonioapparent material comprised by the object, and provides a description of the appearance of the material and many other appearance attributes, such as gloss, haze, and color, can be easily derived from the BRDF.

Generally, the BRDF consists of three color coordinates as a function of scattering geometry. The specific illuminant and the color system (for example CIELAB) must be specified and included with any data when dealing with the BRDF.

The data contained in the BTF generated by the proposed method of the present disclosure can be used for a wide variety of purposes. The absolute color or reflectance data can be used in conjunction with pigment mixture models to aid in the formulation of paints containing effect flake pigments, to assess and insure color match at a wide variety of illumination and viewing conditions, for example, between an automobile body and a bumper.

Effect flake pigments include metallic flake pigments, such as aluminium flakes, coated aluminium flakes, copper flakes and the like. Effect flake pigments also include special effect flake pigments which cause a hue shift, such as pearlescent pigments, such as mica flakes, glass flakes, and the like.

As can be recognized from equation (1), the first term, i.e. the BRDF is divided into a first sub-term corresponding to a color table $x(\bar{i},\bar{o})$ and a second sub-term corresponding to an intensity function $$\left(\frac{a}{\pi} + \sum_{k=1}^{3} f_{S_k, \alpha_k, F_{0,k}}^{CT}(\bar{i}, \bar{o})\right).$$

The parameters of the initial BTF are optimized to minimize a color difference between the spectral reflectance data and the initial BTF by optimizing in a first optimization step the parameters of the color table while the parameters of the intensity function are kept constant, and by optimizing in a second optimization step the parameters of the intensity function while the parameters of the color table are kept constant.

The spectral reflectance data, i.e. the spectral reflectance curves are acquired only for a limited number of measurement geometries. Each such measurement geometry is defined by a specific illumination angle/direction and a specific viewing angle/direction. The spectral reflectance measurements are performed, for example, by a hand-held spectrophotometer, such as, for example, a Byk-Mac I® with six measurement geometries (a fixed illumination angle and viewing/measurement angles of −15°, 15°, 25°, 45°, 75°, 110°), an X-Rite MA-T12® with twelve measurement geometries (two illumination angles and six angles of measurement), or an X-Rite MA 98® (two illumination angles and up to eleven angles of measurement). The spectral reflectance data obtained from these measurement devices are more accurate than the color information obtained from the camera-based measurement device.

According to an embodiment of the claimed method, for the optimization of the color table in the first optimization step for each spectral measurement geometry first CIEL*a*b* values are computed from the spectral reflectance data (curves) and second CIEL*a*b* values are computed from the initial BTF, and correction vectors in a* and b* coordinates are computed by subtracting the second CIEa*b* values from the first CIEa*b* values and the correction vectors are component-wise interpolated and extrapolated for the complete range of viewing and illumination angles stored in the color table, the interpolated correction vectors are applied to the initial BTF CIEL*a*b* values for each spectral measurement geometry stored in the color table and the corrected BTF CIEL*a*b* values are transformed to linear sRGB coordinates which are normalized (so that their sum is, for example, equal to 3) and finally stored in the color table.

A multilevel B-Spline interpolation algorithm (see Lee, Seungyong, George Wolberg, and Sung Yong Shin. "Scattered data interpolation with multilevel B-splines". IEEE transactions on visualization and computer graphics 3, Nr. 3 (1997): 228-244) can be used for the component-wise interpolation and extrapolation of the correction vectors.

According to still a further embodiment of the claimed method, for optimization of the parameters of the intensity function in the second optimization step, a cost function is defined based on the sum of the color differences across all spectral reflectance measurements geometries. The cost function $C(\alpha, S, F_0, a)$ is defined across all reflectance measurement geometries according to the following equation:

$$C(\alpha, S, F_0, a) = \Sigma_{g \in G} \Delta E(f(x, \vec{i}, \vec{o}) \cdot F_{CC}(i, o), f_{REF}(\vec{i}, \vec{o})) + P(\alpha, S, F_0, \alpha) \quad (2)$$

G: The set of measurement geometries for which spectral reflectance data is available g: One out of the set of measurement geometries $\Delta E(f_{Test}, f_{Ref})$: A weighted color difference formula measuring the difference between the colors $f_{Test}$ and $f_{Ref}$ $f_{Ref}(\vec{i}, \vec{o})$: Reference color derived from spectral measurement $(f_{Test} = f(x, \vec{i}, \vec{o}) \cdot F_{CC}(i, o)$: Test color computed from the initial BTF for the given illumination and observation direction $\alpha = (\alpha_1, \alpha_2, \alpha_3)$: Vector of parameters for the Beckmann distribution of the three Cook-Torrance lobes $S = (S_1, S_2, S_3)$: Vector of weights for the three Cook-Torrance lobes $F_0 = (F_{0,1}, F_{0,2}, F_{0,3})$: Vector of Fresnel reflections for the three Cook-Torrance lobes $P(\alpha, S, F_0, \alpha)$: Penalty function As indicated in equation (2) the cost function can be supplemented by a penalty function which is designed to take specific constraints into account, such constraints preferably comprise to keep the parameter values in a valid range.

To compute the color difference the initial BTF is evaluated at the different spectral reflectance measurement geometries and the resulting CIEL*a*b* values are compared to the CIEL*a*b* values from the spectral reflectance measurements using a weighted color difference formula such as, for example, the formula defined in DIN6157/2, and the parameters of the intensity function are optimized using a non-linear optimization method, such as, for example the Nelder-Mead-Downhill-Simplex method, so that the cost function is minimized.

According to still a further embodiment, the first and the second optimization steps are run repeatedly/iteratively to further improve an accuracy of the optimized BTF. The number of iterations can be specified and pre-defined. It has been found that three iterations can already yield reliable good results.

It has been found that the optimized BTF is more accurate than the initial BTF which is obtained directly from the camera-based device. This is the case not only for the few (limited number of) spectral reflectance geometries where additional spectral reflectance data are provided, but for the complete range of illumination and viewing directions.

The claimed method and systems are applicable not only to car paint color design processes but also to comparable processes, for example, in cosmetics and electronics.

The present disclosure also refers to a system for generating a bi-directional texture function (BTF) of an object, the system comprising:

a camera-based measurement device which is configured to measure an initial BTF for the object, a spectrophotometer which is configured to capture spectral reflectance data for the object for a pre-given number of different measurement geometries, a computing device which is in communicative connection with the camera-based measurement device and with the spectrophotometer, respectively, and which is configured to receive via the respective communicative connection the initial BTF and the captured spectral reflectance data for the object, and to adapt the initial BTF to the captured reflectance data, thus gaining an optimized BTF.

The camera-based measurement device can be a commercially available device, such as, for example, the X-Rite TAC7® (Total Appearance Capture).

The camera-based measurement device is configured to capture images/photos of the object/sample at different illumination angles and at different viewing angles and at different illumination color and at different exposure times. Images with different illumination colors and exposure times can be combined to images with a high dynamic range (HDR images). The perspective of the images relative to the object/sample can be corrected.

The spectrophotometer can be chosen as a handheld spectrophotometer. The spectrophotometer is a multi-angle spectrophotometer.

The object can be a car paint sample coated on a panel or any other paint, particularly a paint comprising gonioapparent material, such as effect flake pigments.

The system may further comprise a database which is configured to store the initial BTF, the spectral reflectance data for the object for the pre-given number of different measurement geometries and the optimized BTF. The computing device may be in communicative connection with the database in order to retrieve the initial BTF and the spectral reflectance data for the object for the pre-given number of different measurement geometries and to store the optimized BTF. That means that the initial BTF gained from the camera-based measurement device and the spectral reflectance data captured by the spectrophotometer may be first stored in the database before the computing device retrieves the initial BTF and the spectral reflectance data in order to adapt the initial BTF to the captured reflectance data, thus gaining the optimized BTF. In such scenario, the camera-based measurement device and the spectrophotometer are also in communicative connection with the database.

Thus, both the communicative connection between the computing device and the camera-based measurement device and the communicative connection between the computing device and the spectrophotometer may be a direct connection or an indirect connection via the database, respectively. Each communicative connection may be a wired or a wireless connection. Each suitable communication technology may be used. The computing device, the camera-based measurement device and the spectrophotometer, each may include one or more communications interface for communicating with each other. Such communication may be executed using a wired data transmission protocol, such as fiber distributed data interface (FDDI), digital subscriber line (DSL), Ethernet, asynchronous transfer mode (ATM), or any other wired transmission protocol. Alternatively, the communication may be wirelessly via wireless communication networks using any of a variety of protocols, such as General Packet Radio Service (GPRS), Universal Mobile Telecommunications System (UMTS), Code Division Multiple Access (CDMA), Long Term Evolution (LTE), wireless Universal Serial Bus (USB), and/or any other wireless protocol. The respective communication may be a combination of a wireless and a wired communication.

The computing device may include or may be in communication with one or more input units, such as a touch screen, an audio input, a movement input, a mouse, a keypad input and/or the like. Further the computing device may include or may be in communication with one or more output units, such as an audio output, a video output, screen/display output, and/or the like.

Embodiments of the invention may be used with or incorporated in a computer system that may be a standalone unit or include one or more remote terminals or devices in communication with a central computer, located, for example, in a cloud, via a network such as, for example, the Internet or an intranet. As such, the computing device described herein and related components may be a portion of a local computer system or a remote computer or an online system or a combination thereof. The database and software described herein may be stored in computer internal memory or in a non-transistory computer readable medium.

When optimizing the color table, for each spectral reflectance measurement geometry of the spectrophotometer a correction vector is determined. The correction vector results as a difference of the reflected radiance in the RGB channels from the BRDF part of the initial BTF and the spectral reflectance data for the same geometry, respectively. The computation of the correction vectors is performed in the CIEL*a*b* color space. The resulting correction vectors are interpolated component-wise over the entire parameter range of the color table.

The claimed system is particularly configured to perform the claimed method.

In order to reflect the texture of the car paint correctly the BTF comprises the table of spatial texture images depending on illumination and observation angle/direction.

The disclosure also relates to a computer system comprising:
a computer unit;
a computer readable program with program code stored in a non-transistory computer-readable storage medium, the program code causes the computer unit, when the program is executed on the computer unit, to perform the following:
    acquiring and receiving an initial BTF for an object and spectral reflectance data for the object wherein the initial BTF being measured by a camera-based measurement device, and the spectral reflectance data are captured by a spectrophotometer for a pre-given number of different measurement geometries;
    fitting the spectral reflectance data with the initial BTF by adapting parameters of the initial BTF accordingly, thus obtaining an optimized BTF.

The initial BTF for the object and the spectral reflectance data for the object can be obtained, respectively, by (a) measurements of the object or (b) previously measured data of the object from a data base containing measurements of the object.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

BRIEF DESCRIPTION OF THE DRAWINGS

FIG. 1 shows a flowchart of a process that may be completed in accordance with an exemplary embodiment of the claimed method.

DETAILED DESCRIPTION

The present disclosure provides a method for determining a BTF of an object and associated systems. FIG. 1 provides a flowchart illustrating a process that may be executed in accordance with various embodiments of the claimed method and systems. Starting at step 102, an object is placed in a camera-based measurement device for measuring an initial BTF 103 of the object. The initial BTF 103 is gained as outcome of the measurement. At step 104 the object is placed in a spectrophotometer which is configured to capture respective spectral reflectance data for the object for a pre-given number of different measurement geometries. As a result, spectral reflectance data 105 (reflectance spectra for the different spectral measurement geometries) for the object are obtained for the limited number of different measurement geometries of the spectrophotometer. When reflectance spectra (reflectance data) have been captured at each desired (pre-given) measurement geometry, at step 106 the initial BTF 103 is adapted to the captured spectral reflectance data 105 by adapting the parameters of the initial BTF accordingly. As a result, an optimized BTF 107 is obtained.

The invention claimed is:

1. A method for generating a bi-directional texture function (BTF) of an object, the method comprising at least the following steps:
    measuring an initial BTF (103) for the object using a camera-based measurement device,
    capturing spectral reflectance data (105) for the object for a pre-given number of different measurement geometries using a spectrophotometer, and
    adapting the initial BTF (103) to the captured spectral reflectance data (105), thus, gaining an optimized BTF (107);
    wherein adapting the initial BTF (103) to the captured spectral reflectance data (105), thus, gaining an optimized BTF (107), comprises segmenting the initial BTF (103) into different terms, each term comprising a set of parameters, and optimizing the parameters of each term separately using the captured spectral reflectance data (105).

2. The method according to claim 1, wherein the camera-based measurement device creates a plurality of images of the object at different viewing angles, at different illumination angles, for different illumination colors and/or for different exposure times, thus providing a plurality of measurement data considering a plurality of combinations of illumination angle, viewing angle, illumination color and/or exposure time.

3. The method according to claim 2, wherein the images with different illumination color and different exposure time, but with equal illumination angle and viewing angle are combined to images with high dynamic range, respectively.

4. The method according to claim 1, wherein the initial BTF (103) is segmented into two main terms, a first term being a homogeneous bi-directional reflectance distribution function (BRDF) which describes reflectance properties of the object depending only on the measurement geometry and the second term being a texture function which accounts for a spatially varying appearance of the object.

5. The method according to claim 4, wherein the first term is divided into a first sub-term corresponding to a color table and a second sub-term corresponding to an intensity function, and the parameters of the initial BTF (103) are optimized to minimize a color difference between the spectral reflectance data (105) and the initial BTF (103) by optimizing in a first optimization step the parameters of the color table while the parameters of the intensity function are kept constant, and by optimizing in a second optimization step the parameters of the intensity function while the parameters of the color table are kept constant.

6. The method according to claim 5 wherein for the optimization of the color table for each spectral measurement geometry first CIEL*a*b* values are computed from the spectral reflectance data (105) and second CIEL*a*b* values are computed from the initial BTF (103), and correction vectors in a* and b* coordinates are computed by subtracting the second CIEa*b* values from the first CIEa*b* values and the correction vectors are component-wise interpolated and extrapolated for the complete range of viewing and illumination angles stored in the color table, the interpolated correction vectors are applied to the initial BTF (103) CIEL*a*b* values for each spectral measurement geometry stored in the color table and the corrected BTF CIEL*a*b* values are transformed to linear sRGB coordinates which are normalized and finally stored in the color table.

7. The method according to claim 6 wherein a multilevel B-Spline interpolation algorithm is used for the component-wise interpolation and extrapolation of the correction vectors.

8. The method according to claim 5, wherein for optimization of the parameters of the intensity function a cost function is defined based on the sum of the color differences across all spectral reflectance measurements geometries.

9. The method according to claim 8 wherein the cost function is supplemented by a penalty function which is designed to take specific constraints into account.

10. The method according to claim 8 wherein the initial BTF (103) is evaluated at the different spectral reflectance measurement geometries and the resulting CIEL*a*b* values are compared to the CIEL*a*b* values from the spectral reflectance measurements using a weighted color difference formula and the parameters of the intensity function are optimized using a non-linear optimization method so that the cost function is minimized.

11. The method according to claim 5 wherein the first and the second optimization steps are run repeatedly/iteratively to further improve an accuracy of the optimized BTF (107).

12. A system for generating a bi-directional texture function (BTF) of an object, the system comprising:
a camera-based measurement device which is configured to measure an initial BTF (103) for the object,
a spectrophotometer which is configured to capture spectral reflectance data (105) for the object for a pre-given number of different measurement geometries, and
a computing device which is in communicative connection with the camera-based measurement device and with the spectrophotometer, respectively, and which is configured to receive via the respective communicative connection the initial BTF (103) and the captured spectral reflectance (105) data for the object, and to adapt the initial BTF (103) to the captured reflectance data (105), thus gaining an optimized BTF (107);
wherein being configured to receive via the respective communicative connection the initial BTF (103) and the captured spectral reflectance (105) data for the object, and to adapt the initial BTF (103) to the captured reflectance data (105), thus gaining an optimized BTF (107), comprises being configured to segment the initial BTF (103) into different terms, each term comprising a set of parameters, and optimize the parameters of each term separately using the captured spectral reflectance data (105).

13. The system according to claim 12 which is configured to perform a method comprising at least the following steps:
measuring an initial BTF (103) for an object using a camera-based measurement device,
capturing spectral reflectance data (105) for the object for a pre-given number of different measurement geometries using a spectrophotometer, and
adapting the initial BTF (103) to the captured spectral reflectance data (105), thus, gaining an optimized BTF (107).

14. A computer system comprising:
a computer unit; and
a computer readable program with program code stored in a non-transitory computer-readable storage medium which causes, when the program is executed on the computer unit, to perform the following:
acquiring and receiving an initial BTF (103) for an object and spectral reflectance data (105) for the object wherein the initial BTF (103) being measured by a camera-based measurement device, and the spectral reflectance data (105) are captured by a spectrophotometer for a pre-given number of different measurement geometries; and
fitting the spectral reflectance data (105) with the initial BTF (103) by adapting parameters of the initial BTF (103) accordingly, thus obtaining an optimized BTF (107);
wherein fitting the spectral reflectance data (105) with the initial BTF (103) by adapting parameters of the initial BTF (103) accordingly, thus obtaining an optimized BTF (107), comprises segmenting the initial BTF (103) into different terms, each term comprising a set of parameters, and optimizing the parameters of each term separately using the captured spectral reflectance data (105).

15. The method according to claim 8 wherein the cost function is supplemented by a penalty function which is designed to take specific constraints into account, such constraints comprising keeping the parameter values in a valid range.

16. The method according to claim 11 wherein the number of iterations is pre-defined.

* * * * *